United States Patent
Kuhn et al.

(10) Patent No.: US 7,341,263 B2
(45) Date of Patent: Mar. 11, 2008

(54) HYDROPNEUMATIC SUSPENSION

(75) Inventors: Michael Kuhn, Wotenitz (DE); Hubertus Schmidt, Sulzbach (DE)

(73) Assignee: Hydac System GmbH, Sulzbach/Saar (DE)

( * ) Notice: Subject to any disclaimer, the term of this patent is extended or adjusted under 35 U.S.C. 154(b) by 431 days.

(21) Appl. No.: 10/519,784

(22) PCT Filed: Apr. 8, 2004

(86) PCT No.: PCT/EP2004/003759

§ 371 (c)(1),
(2), (4) Date: Dec. 29, 2004

(87) PCT Pub. No.: WO2004/098918

PCT Pub. Date: Nov. 18, 2004

(65) Prior Publication Data

US 2006/0055142 A1    Mar. 16, 2006

(30) Foreign Application Priority Data

May 9, 2003  (DE) .................. 103 20 954

(51) Int. Cl.
 *B60G 11/26* (2006.01)
(52) U.S. Cl. .................. 280/124.157; 280/124.16; 280/124.161
(58) Field of Classification Search ......... 280/124.157, 280/124.158, 124.159, 124.16, 124.161
See application file for complete search history.

(56) References Cited

U.S. PATENT DOCUMENTS 3,761,110 A    9/1973    Grosseau

FOREIGN PATENT DOCUMENTS

| DE | 37 42 883 A1 | 7/1989 |
|---|---|---|
| DE | 42 42 448 C1 | 3/1994 |

*Primary Examiner*—Eric Culbreth
(74) *Attorney, Agent, or Firm*—Roylance, Abrams, Berdo & Goodman, L.L.P.

(57) ABSTRACT

A hydropneumatic suspension having at least one suspension cylinder (10) and at least one hydraulic accumulator configured as a suspension accumulator (18) has a pilot-actuated valve (20) for opening or blocking a fluid-carrying connection between the suspension cylinder (10) and the suspension accumulator (18). The pilot-actuated valve (20) can be moved into the blocked position by a hydraulic actuating assembly (22). The hydraulic actuating assembly (22) taps the fluid pressure between suspension accumulator (18) and the suspension cylinder (10), and forwards it by a switching valve (24) to an operating side (26) of the pilot-actuated valve (20) through a pilot-actuated line (38). Another proportional valve (50), or such valve connected to the respective associated pilot-actuated line (38), can be between one switching valve (24) and the pilot-actuated valve (20).

10 Claims, 3 Drawing Sheets

HYDROPNEUMATIC SUSPENSION

FIELD OF THE INVENTION

The present invention relates to a hydropneumatic suspension having at least one suspension cylinder and at least one suspension accumulator, in particular a hydraulic accumulator with a pilot-actuated valve. Specifically, a proportional valve opens or blocks a fluid-carrying connection between suspension cylinder and suspension accumulator.

BACKGROUND OF THE INVENTION

Hydropneumatic suspensions are used, for example, as rear-axle suspensions in tractors or other machines. If a fluid-carrying connection is established between a suspension accumulator and a suspension cylinder by the pilot-actuated valve, especially one in the form of a conventional hydraulic accumulator or working cylinder connected to the respective wheel set of the tractor or machine, the wheel axis for the respective operating application is correspondingly spring-suspended. If it is now desired to use the machine, especially one in the form of a tractor, to carry out operating processes such as plowing of a field with plowing equipment, the suspension is to be blocked. Specifically, the connection between suspension cylinder and suspension accumulator is interrupted by the pilot-actuated valve. This arrangement presents the advantage that the "working height" of the plow or other equipment may not be changed unintentionally, something which might impair the respective application intended.

The known technical solutions, such as are commercially available, normally employ purely electric actuation of the pilot-actuated stop valve for the associated stopping of the hydropneumatic suspension. Since this pilot-actuated valve is configured to be quite large in view of the volumes of flow to be controlled, high actuating forces are required to switch the valve. The high-switching forces in turn lead to use of switching magnets of correspondingly large size for actuation of the valve, and require correspondingly high electric power consumption. In addition, when the hydropneumatic suspension is at rest with the pilot-actuated valve in its blocked position, the respective drive configuration is rigid by design and effects exerted on the operating equipment, for example, by uneven ground over which the tractor or machine is operated, cause respective disruptive influences. Such disruptive influences are transmitted to the operating equipment, such as a plow, and may significantly impair the plowing process itself. The vehicle is designed to be more rigid from the viewpoint of its driving behavior than control of the plow and permits for an operating process, such as plowing or the like. In known solutions during the unblocking process, which takes place rapidly, any difference in pressure between suspension cylinder and pressure accumulator which may be present is very quickly equalized, resulting in "bouncing" of the vehicle.

The proximate state of the art in the form of DE 42 42 448 C1 relates to a hydropneumatic suspension assembly for vehicles with high load ratios, in particular for tractors with means for mounting cultivators and load-sensing pumps for pressure generation. Pressure also is applied to the annuli of the suspension cylinders connected to a hydraulic accumulator. Known configurations of this type have control mechanisms which must be fed by constant-pressure systems. The use of a load-sensing pump is of no avail, since it would always have to deliver against high pressure. These known systems also present the disadvantage that they continuously consume energy. According to the solution disclosed in DE 42 42 448 C1, conservation of energy and the possibility of using a load-sensing pump are achieved in that the annulus is supplied with pressure by a 3-way pressure control valve and in that a level control assembly having a valve assembly is provided. The level control with its valve assembly is briefly activated and deactivated only when static load changes occur and removes pressure from all control and feed lines in the position at rest which is otherwise assumed. The piston chambers and annuli are hermetically sealed off by return valves that may be unblocked.

Even with this known solution, the possibility is not excluded of movements occurring unintentionally at the vehicle during the unblocking process because of the pressure difference which may be present.

SUMMARY OF THE INVENTION

Objects of the present invention are to provide a compact and energy-efficient valve control assembly for hydropneumatic suspensions which ensures both control of large volume flows and "gentle" unblocking of the hydropneumatic suspension and to avoid the problems of conventional systems.

These objects are attained by a hydropneumatic suspension having its pilot-actuated valve moved to the blocked position by a hydraulic actuating mechanism, in that the hydraulic actuating mechanism taps the fluid pressure between suspension accumulator and respective associated suspension cylinder and forwards it by a valve, a switching valve in particular, to an actuating side of the pilot-actuated valve by at least one pilot-actuated line. Between the one valve and the pilot-actuated valve, another or second valve, a proportional valve in particular, is provided to which the respective associated pilot-actuated line is connected. The suspension configuration of the present invention permits controlling large volume flows and allows slow release of the suspension. Any pressure differences present between suspension cylinder and pressure accumulator may be equalized slowly so that the undesirable "bouncing" of the vehicle or the machine is reliably prevented.

The release mechanism, based essentially on a hydraulic concept, is structurally compact and cost effective in production. Since a hydraulic medium is already used to produce the hydropneumatic suspension, another type of energy (electric current) obviously need not be used to operate the respective suspension. This arrangement in turn lowers the production costs and maintenance effort. It has been found to be especially advantageous to employ a proportional pressure control valve as the second valve. In one preferred embodiment of the hydropneumatic suspension of the present invention, the pilot-actuated valve has two actuation sides, one with a pilot operating component and the other with a reset spring. Both actuation sides are connected to fluid lines in the form of first and second pilot-actuated lines. In another preferred embodiment of the hydropneumatic suspension of the present invention, the proportional pressure control valve is mounted between the first valve and a branch connected both to a fluid-carrying connection to the tank and to the second pilot-actuated of the pilot-actuated valve.

As an alternative, in another preferred embodiment of the hydropneumatic suspension of the present invention, the proportional pressure control valve is connected to the first pilot-actuated line. This proportional pressure control valve is connected to a branch with a return valve opening in the direction of the pilot-actuated component of the pilot-actuated valve.

In the case of the last-described embodiment, advantageously the proportional pressure control valve connected to the first pilot-actuated line is secured from an unintentionally wrong direction of fluid flow by return valves as a type of bridge circuit.

By preference, a proportional valve, in particular one in the form of a 2/2-way valve, is used as pilot-actuated valve. The first valve or switching valve is in the form of a 2/3 way seat valve, in production of the hydropneumatic suspension.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
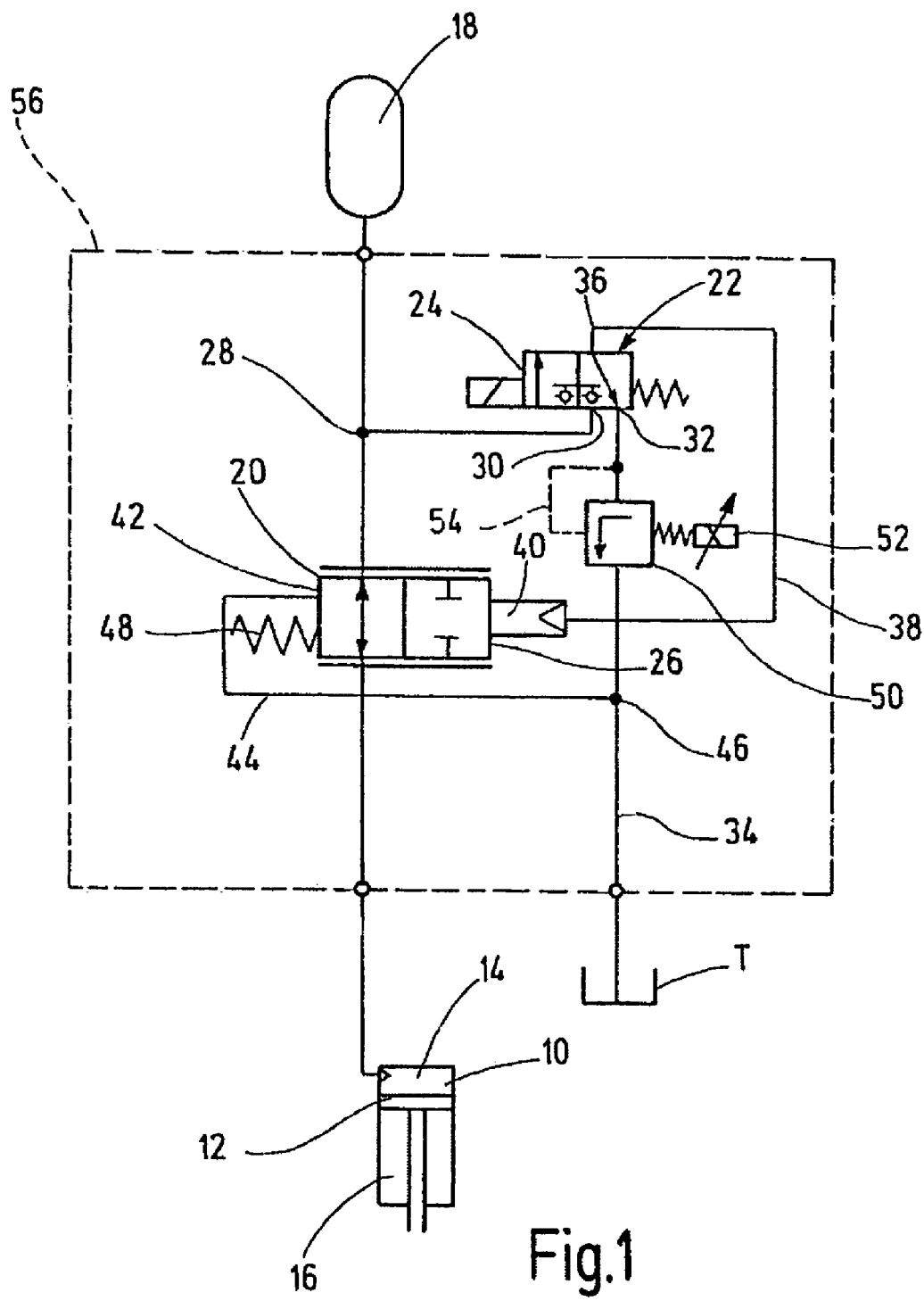
FIG. 1 is a schematic diagram, not to scale, of a hydraulic circuit of a hydropneumatic suspension according to a first embodiment of the present invention.

The hydropneumatic suspension presented in FIG. 1 has a suspension cylinder 10 of the conventional design. The suspension cylinder 10 is provided with a piston rod unit 12. An axletree or axle set of a corresponding wheel set (not shown) is mounted on the free end of this piston rod of this unit. As the piston rod unit 12 moves back and forth inside the suspension cylinder 10, a hydraulic medium is moved in and out in the conventional manner in the two working spaces 14, 16, so that the respective details will not be discussed at this point.

As is to be described in detail in the following, the suspension cylinder 10 is connected for operation to a suspension accumulator 18 in the form of a conventional operating or hydraulic accumulator, such as one in the form of a diaphragm or bladder accumulator. A separating mechanism (not shown) in the form of a separating diaphragm or separating bladder separates the hydraulic medium for the suspension from a supply of gas in the accumulator. The pressure cushion of the accumulator also determines the rigidity of the respective suspension cylinder 10. The accumulator configuration is for the most part also conventional for hydropneumatic suspensions, and will not be discussed in further detail.

What remains to be determined, however, as has been indicated, is how a suspension cylinder 10 may be associated with a suspension accumulator 18. Configurations are also conceivable in which suspension cylinder 10 and suspension accumulator 18 are present in a plurality of arrangements. A suspension accumulator 18 may actuate several suspension cylinders 10 correspondingly for their spring deflection processes. Inserted between the suspension cylinder 10 and the suspension accumulator 18 is a pilot-actuated valve 20, shown in FIG. 1 in its neutral position, that is, in its switched, released, open position in which the working space 14 of the suspension cylinder 10 is connected to the fluid side of the suspension accumulator 18 to carry fluid and accordingly to form the hydropneumatic suspension for the wheel set and axletree (not shown).

The pilot-actuated valve 20, especially in the form of a proportional valve, may be moved to the blocked position by a hydraulic actuating assembly 22. In this blocked position, the fluid-carrying connection is interrupted between suspension cylinder 10 and suspension accumulator 18 relative to the pilot-actuated valve 20. The hydraulic actuating assembly 22 taps the fluid pressure between suspension accumulator 18 and the associated suspension cylinder 10, specifically between suspension accumulator 18 and valve 20 at tapping point 28 and delivers this pressure by a switching valve 24 to one of the operating sides 26 of the pilot-actuated valve 20. The switching valve 24, in the form of a 3/2-way seat valve, has, in addition to a first input 30, which is connected to the tapping point 28 to carry fluid, a second input 32 connected to the tank T of the hydropneumatic suspension by a connecting line 34. The switching valve 24 also has an output 36 to which a pilot-actuated line 38 is connected to the pilot-actuated component 40 of the valve 20 on the operating side 26 of the pilot-actuated valve 20. In addition to the first pilot-actuated line 38, the other operating side 42 of the valve 20 is connected to another, second, pilot-actuated line 44 communicating with the connecting line 34 leading to the tank T by a connection 46. A pressure spring 48, as a reset assembly, is connected by conventional means to the other operating side 42 of the valve 20.

Another valve in the form of a proportional-pressure control valve 50 is connected to the connecting line 34 between the second input 32 of the switching valve 24 and the connection 46. The opening characteristic for the valve 50 may be assigned conventionally by a control assembly 52. The secondary branch line 54 connected to the connecting line 34 serves to tap the pressure between proportional-pressure control valve 50 and the second input 32 of the switching valve 24. The control assembly as thus structured forms a sort of blocking unit 56, which in FIG. 1 is shown enclosed in a box drawn in broken lines.

For a better understanding of the function of the hydropneumatic suspension, reference is made in detail to the illustration in FIG. 1. In the "open" position shown in FIG. 1, the pilot-actuated 2/2-way valve 20 connects the suspension cylinder 10 to the suspension accumulator 18. The pilot-actuated line 38 of this valve 20 is connected by the 2/3-way seat valve 24 as a switching valve and by the proportional pressure control valve 50 to the tank T. The suspension is fully active in the respective "open" position.

If the suspension is now switched to the "blocked" position, for example, so as to permit proper operation with a piece of operating equipment such as a plow, mounted on a tractor, the switching valve 24 is actuated, in such a way that the suspension accumulator 18 is connected to the pilot-actuated component 40, one in the form of a pilot-actuated piston, for example, by the first pilot-actuated line 38. The entire pressure present in the suspension accumulator 18 may be used as pilot-actuated energy. The hydraulically pilot-actuated valve 20 is switched to its blocked position, on the right as viewed in FIG. 1. The valve 20 is thereby closed and the suspension accumulator 18 thus disconnected from the suspension cylinder 10.

If it is desired now to relieve this blocked state over a relatively lengthy period, that is, to "unblock slowly," the 3/2-way valve 24 is to be switched and the output 36 of the valve 24 is then connected to the second input 32 of this valve so that fluid may be carried. The pilot-actuated pressure of the pilot-actuated valve 20 present in the first pilot-actuated line 38 is then applied by the switching valve 24 to the proportional pressure control valve 50 so that the proportional pressure control valve 50 can lower the pilot-actuated pressure by a specific amount. As a result of the specific lowering of the pilot-actuated pressure, the piston position of the pilot-actuated component 40 and accordingly the volume flow of the fluid to be transported between suspension accumulator 18 and suspension cylinder 10 may be determined precisely and adjusted. However, in that the valve 20 may be opened proportionally in relation to the actuating system of the pressure control valve 50, the unblocking process proceeds slowly and the so-called "bouncing" of the vehicle, such as one in the form of a machine such as a tractor or the like, cannot be caused unintentionally. If the valve 20 illustrated is in turn blocked, the amount of fluid displaced in the second pilot-actuated line 44 may be moved to the tank T by the connecting line 34.

In summary, the particular features of the hydropneumatic suspension are thus as follows. First of all, the pressure present in the suspension accumulator 18 is used to the fullest extent as pilot-actuated energy for the valve 20. The pilot-actuated pressure may be suitably controlled by the proportional pressure control valve 50, which may be connected to the pilot-actuated line 38. An axial displacement force is generated on the valve piston of the pilot-actuated component 40 by the pilot-actuated pressure. This force acts against the reset spring 48 of the valve 20, so that the piston position may be determined at the same time the amount of fluid is transmitted between suspension accumulator 18 and suspension cylinder 10. In that the valve 20 may be opened slowly in the unblocking process, any difference in pressure which may be present between suspension cylinder 10 and suspension accumulator 18 may be slowly equalized, so that undesirable "bouncing" of the working vehicle is avoided during unblocking of the suspension.

Figure 2:
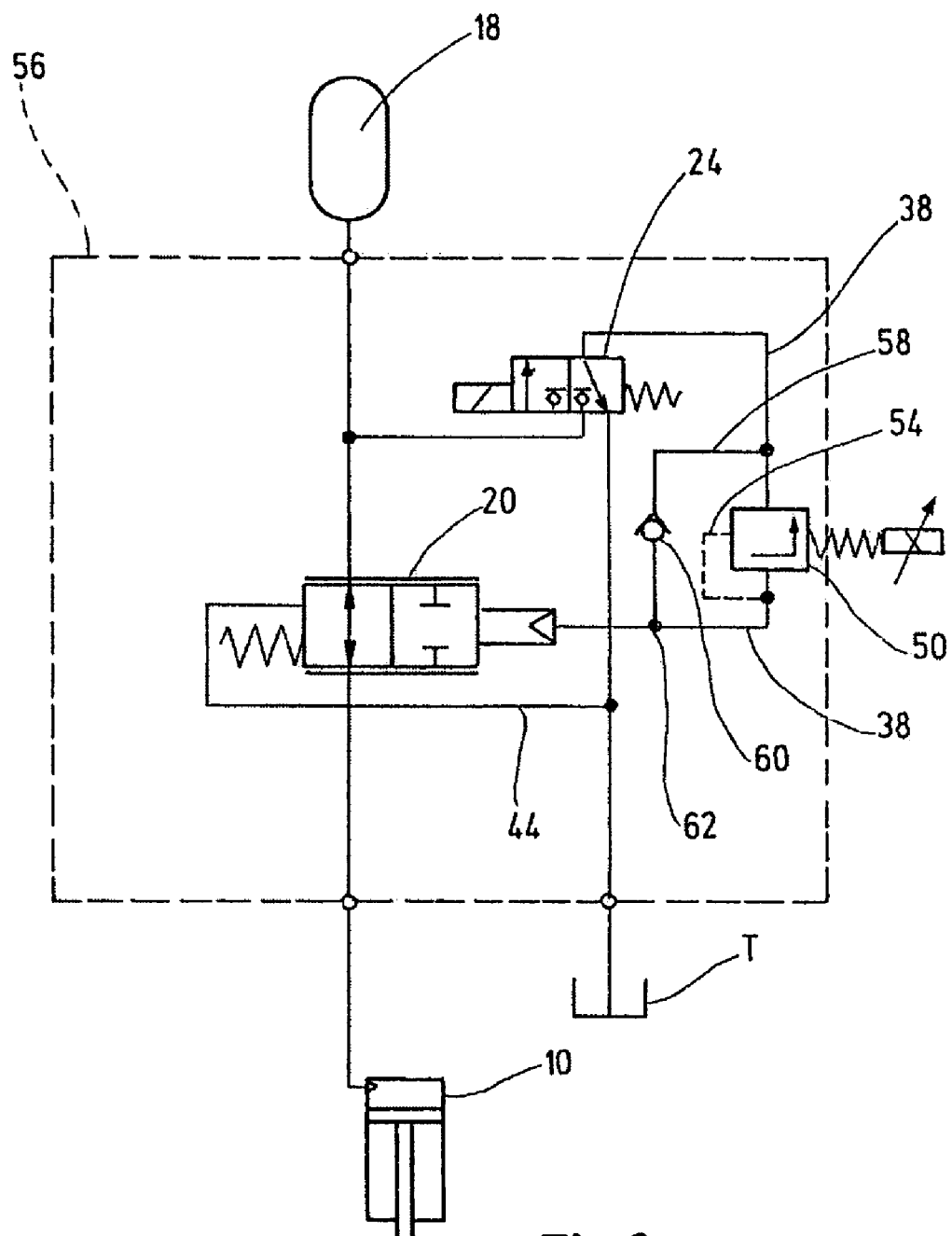
FIG. 2 is a schematic diagram, not to scale, of a hydraulic circuit of a hydropneumatic suspension according to a second embodiment of the present invention.
Figure 3:
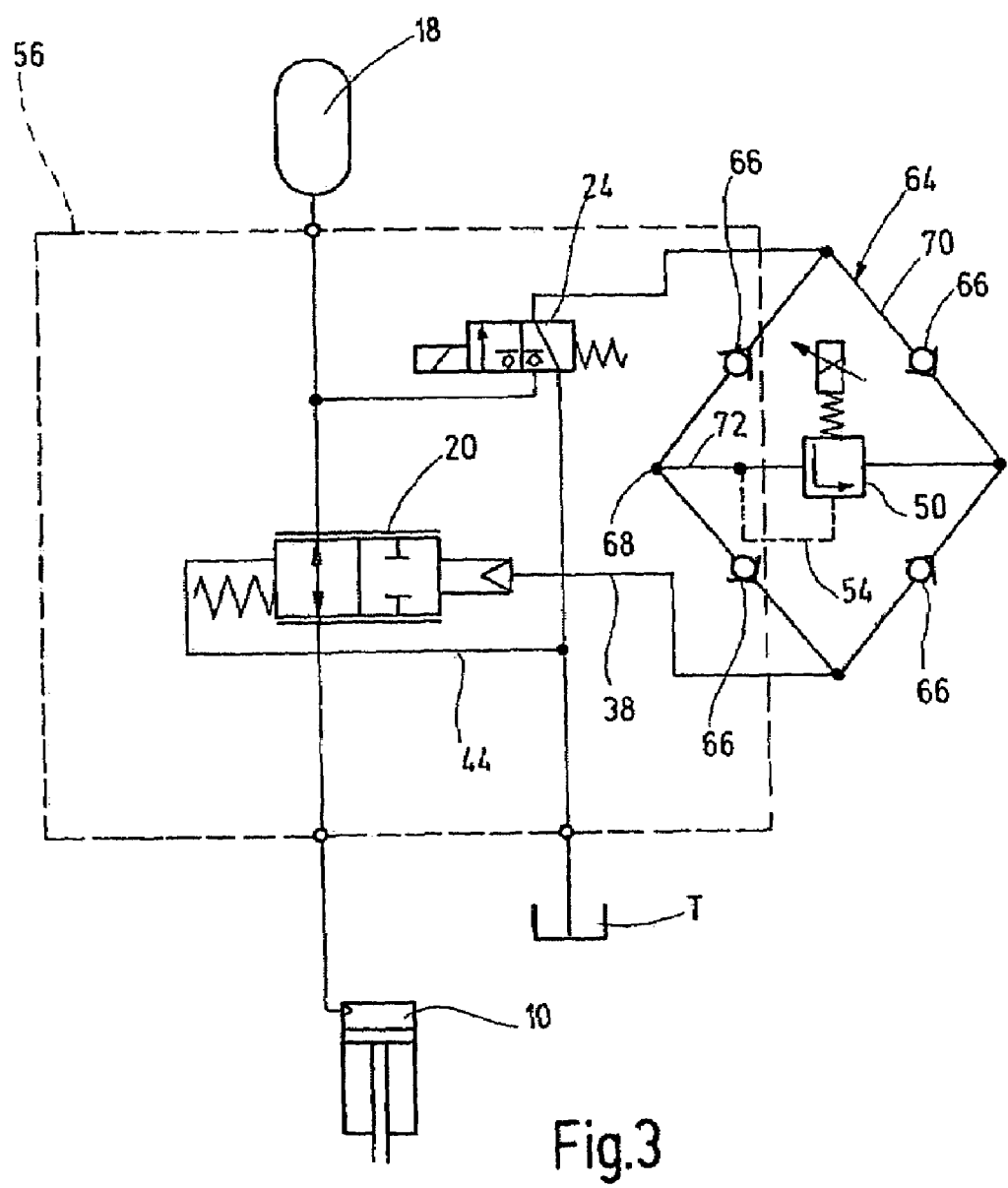
FIG. 3 is a schematic diagram, not to scale, of a hydraulic circuit of a hydropneumatic suspension according to a third embodiment of the present invention.

For the sake of simplification the same reference numbers used for the switching and structural components in FIG. 1 are used in description of the second and third embodiments illustrated in FIGS. 2 and 3. The modified embodiments do nothing to alter the operating process as described in the foregoing and accordingly merely represent modifications of the embodiment illustrated in FIG. 1.

In the embodiment shown in FIG. 2, the proportional pressure control valve 50 is connected directly to the first pilot-actuated line 38 for the valve 20. A return valve 60 opening in the direction of the pilot-actuated component 40 is connected to the secondary branch 58. In addition, tapping of pressure for the proportional-pressure control valve 50 is effected at a point between the valve 50 and a connecting point 62 for the return valve 50 in the first pilot-actuated line 38. Consequently, for a slow unblocking process, i.e., the slow opening of the valve 20, the quantity of fluid forced from the piston of the pilot-actuated component 40 is expelled by the proportional-pressure control valve 50 and the switching valve 24 in the position illustrated in the direction of the tank T.

In the embodiment shown in FIG. 3, the proportional-pressure control valve 50 is in turn defined in the fluid carrying area of the first pilot-actuated line 38 for the valve 20, and is suitably secured from a possibly false fluid flow direction by a hydraulic bridge circuit 64 in the form of a Wheatstone bridge. The bridge circuit 64 has four return valves 66 which may be moved in one of the branch circuits 68, 70 in pairs toward each other for their opened positions. A connecting line 72 to which the proportional pressure control valve 50 is connected is positioned between a pair of return valves 66 in one of the branch circuits 68, 70. If unintentional reversal of the intended fluid flow direction occurs, the respective return valves are blocked and accordingly ensure that the pressure control valve 50 is correctly actuated from the proper side for slow unblocking of the valve 20.

The respective return valves 60 and 66 may also be spring-loaded and kept in their blocked position as a function of the respective application. For greater simplicity of illustration the reset springs have, however, been omitted.

The pneumatic pressure suspension configuration designed as a blocking unit 56 employs a pilot-actuated 2/2-way valve 50 for blocking and "gentle unblocking" of a pneumatic pressure suspension. Large flow volumes may also be reliably controlled with the respective circuit configuration. Also, the solution of the present invention is cost-effective in production.

While various embodiments have been chosen to illustrate the present invention, it will be understood by those skilled in the art that various changes and modifications can be made therein without departing from the scope of the present invention as defined in the appended claims.

What is claimed is:

1. A hydropneumatic suspension, comprising:
   at least one suspension cylinder;
   at least one hydraulic accumulator configured as a suspension accumulator;
   a pilot actuated valve for opening and blocking a fluid carrying connection extending between said suspension cylinder and said suspension accumulator, said pilot-actuated valve being movable between an open position and a blocked position and having first and second operating sides; and
   a hydraulic actuating assembly connected to and moving said pilot-actuated valve from the open position to the blocked position, and tapping fluid pressure at a tapping point between said suspension accumulator and said suspension cylinder, said actuating assembly including a switching valve connected by at a first pilot-actuated line to said first operating side of said pilot-actuated valve for conveying fluid pressure from said tapping point to said first operating side, a second pilot-actuated line extending between said switching valve and said second operating side, and a proportional valve being one of connected to and switched to one of said pilot-actuated lines between said switching valve and said pilot-actuated valve.

2. A hydropneumatic suspension according to claim 1 wherein
   said proportional valve is a proportional-pressure control valve.

3. A hydropneumatic suspension according to claim 2 wherein
   said proportional pressure control valve is mounted between said switching valve and a branch connection having a fluid-carrying connection to a tank and to which said second pilot-actuated line of said pilot-actuated valve is connected.

4. A hydropneumatic suspension according to claim 2 wherein
   said proportional-pressure control valve is connected to said first pilot-actuated line; and a secondary branch is connected to said proportional-pressure control valve and has a return valve opening in a direction of said pilot-actuated valve.

5. A hydropneumatic suspension according to claim 4 wherein
said first pilot-actuated line of said pilot-actuated valve is connected to a fluid-carrying output of said switching valve.

6. A hydropneumatic suspension according to claim 2 wherein
said proportional-pressure control valve is connected to the first pilot-actuated line by a bridge circuit that avoids wrong direction of fluid flow by way of return valves.

7. A hydropneumatic suspension according to claim 1 wherein
said pilot-actuated valve at said first and second operating sides has a pilot-actuated component and a reset spring, respectively.

8. A hydropneumatic suspension according to claim 1 wherein
the pilot-actuated valve is a proportional valve in a form of a 2/2-way valve.

9. A hydropneumatic suspension according to claim 1 wherein
said switching valve is a 3/2-way seat valve.

10. A hydropneumatic suspension according to claim 1 wherein
said pilot-actuated valve is a proportional valve.

* * * * *